United States Patent

Saari

[15] 3,671,636

[45] June 20, 1972

[54] METHODS FOR TREATING HYPERTENSION OR INHIBITING GASTRIC SECRETION

[72] Inventor: Walfred S. Saari, Landsdale, Pa.

[73] Assignee: Merck & Co, Inc., Rahway, N.J.

[22] Filed: Oct. 29, 1969

[21] Appl. No.: 871,214

Related U.S. Application Data

[62] Division of Ser. No. 636,586, May 8, 1967.

[52] U.S. Cl..............................424/330, 424/250, 424/251, 424/263, 424/267, 424/270, 424/273, 424/274, 424/275, 424/283, 424/285
[51] Int. Cl. ........................................................A61k 27/00
[58] Field of Search..................424/330, 263, 267, 250, 273, 424/274, 270, 275, 251, 283, 285; 260/570.6, 332.3

[56] References Cited

FOREIGN PATENTS OR APPLICATIONS 576,312  3/1946  Great Britain

OTHER PUBLICATIONS

Pessina et al., C. A., 62: 14543– 14544 (June, 1965).
Carlsson et al., Acta. Pharmacol. Toxicol., 24(2– 3), 255– 262 (1966).
Karrer, Org. Chem. (Elsevier, N.Y. 1950) pages 97– 108.

Primary Examiner—Stanley J. Friedman
Attorney—Michael C. Sudol, Jr., E. R. Coutts and Harry E. Westlake, Jr.

[57] ABSTRACT

Novel derivatives of 3-hydroxy-$\alpha$-(1-aminoethyl)-benzyl alcohol particularly 3-ether derivatives of erythro and threo 3-hydroxy-$\alpha$-[1-aminoethyl]-benzyl alcohol and their pure enantiomers are described. Also processes for the preparation of the above identified compounds are shown.

The novel derivatives of 3-hydroxy-$\alpha$-(1-aminoethyl)-benzyl alcohol are useful as antihypertensive agents and inhibitors of gastric secretion.

8 Claims, No Drawings

METHODS FOR TREATING HYPERTENSION OR INHIBITING GASTRIC SECRETION

This application is a division of U.S. Ser. No. 636,586 filed May 8, 1967.

This invention relates to novel derivatives of 3-hydroxy-α-(1-aminoethyl)-benzyl alcohol. More specifically it relates to novel 3-ether derivatives of erythro or threo 3-hydroxy-α-[1-aminoethyl]-benzyl alcohol and processes for their preparation. Still more specifically it relates to 3-ether derivatives of the levorotatory enantiomorph of erythro 3-hydroxy-α-(1-aminoethyl)-benzyl alcohol. Also this invention relates to the optically active threo 3-ether derivatives of 3-hydroxy-α-(1-amino-ethyl)-benzyl alcohol.

The absolute configuration of optically active compounds can be described by using the "sequence rule" procedure. In this method, the four groups attached to an asymmetric carbon atom, $C_{abcd}$, are assigned priorities and arranged in sequence so that the stereochemical symbols R or S may be determined. When the asymmetric carbon atom is viewed from the remotest side to the group of lowest priority, $d$, then proceeding from $a$ to $b$ to $c$ traces either a clockwise or a counter-clockwise course. If the course is clockwise, then the symbol R is used to describe the stereochemistry at this asymmetric carbon atom. If it is counter-clockwise, the symbol S is used. When the molecule contains more than one asymmetric center, the procedure is applied to each and the stereochemistry is expressed as a multiplicity of R or S symbols.

Metaraminol [(−) erythro 3-hydroxy-α-(1-amino-ethyl)-benzyl alcohol (1R, 2S configuration)] has recently been reported to be an antihypertensive agent in man [J. R. Crout, R. R. Johnston, W. R. Webb and P. A. Shore, Clin. Res., 13, 204 (1965) and J. R. Crout, Circulation Res., 18, 19 Suppl. 1, 1–120 (1966)]. This antihypertensive action is believed to result from the release and replacement of norepinephrine in adrenergic nerves by metaraminol. I have found that certain 3-ether derivatives of 3-hydroxy-α-(1-aminoethyl)-benzyl alcohol can also release norepinephrine from mouse heart tissue. I have also found that certain 3-ether derivatives of (−) erythro 3-hydroxy-α-(1-aminoethyl)-benzyl alcohol (1R,2S) are dealkylated in vivo to yield metaraminol. In addition, the novel ether derivatives of (−) erythro 3-hydroxy-α-(1-aminoethyl)-benzyl alcohol (1R,2S), especially the benzyl ethers and the halogen substituted benzyl ethers have an advantage over metaraminol in that they do not cause the initial increases in blood pressure and heart rate which are sometimes found with metaraminol.

Also, the novel 3-ether derivatives of 3-hydroxy-α-[1-aminoethyl]-benzyl alcohol can be used as inhibitors of gastric secretion.

It is an object of this invention to provide novel ethers of the phenolic hydroxyl of the erythro and threo forms of 3-hydroxy-α-[1-aminoethyl]-benzyl alcohol and also processes for their preparation. It is a further object of this invention to provide the optically active isomers of these ethers of erythro and threo 3-hydroxy-α-[1-aminoethyl]-benzyl alcohol. A further object of this invention is to provide the erythro and threo 3-ethers of 3-hydroxy-α-[1-aminoethyl]-benzyl alcohol and their pure enantiomers as antihypertensive agents and inhibitors of gastric secretion.

The compounds of this invention may be associated with a carrier which may be either a solid material or a sterile parenteral liquid. The composition may take the form of tablets, powders, capsules or other dosage forms particularly useful for oral ingestion. Liquid diluents are employed in sterile condition for parenteral use. In general, the compounds of this invention are given to patients in doses of 5 to 500 mg. per day. Preferably they are used orally in the range of 5 to 500 mg. per day, especially in frequent smaller doses.

The 3-ether derivatives of this invention can be exemplified by the following formula:

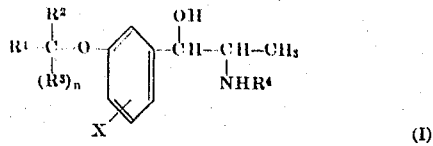

(I)

wherein
$R^1$ is hydrogen, alkyl, substituted alkyl, cycloalkyl, alkenyl, cycloalkenyl, alkoxy, phenyl, substituted phenyl, benzyl or substituted benzyl or a heterocyclic radical and
$R^2$ is hydrogen, alkyl, phenyl or substituted phenyl
and wherein
$R^1$ and $R_2$ can be combined to form a saturated or unsaturated alicyclic or heterocyclic ring;
$R^3$ is hydrogen, alkyl or phenyl;
$R^4$ is hydrogen or lower alkyl;
X is hydrogen, halogen, hydroxy, alkoxy, alkyl or phenyl; and
$n$ is 0 or the interger 1.

In the formula above where $R^1$ is substituted phenyl or substituted benzyl, the substituents can be halogen, preferably chloro or fluoro, lower alkyl or halo lower alkyl such as methyl, ethyl, propyl, isopropyl or trifluoromethyl, lower alkoxy such as methoxy, ethoxy, propoxy or isopropoxy substituents, hydroxy, amino, alkylamino, dialkylamino, mercapto, alkylthio, alkylsulfinyl, alkylsulfonyl, nitro, sulfamoyl, alkylsulfonamido or phenyl. In the case wherein $R^1$ is a heterocyclic ring, the heterocyclic ring can be any three to seven membered saturated or unsaturated ring containing one or more hetero atoms such as sulfur, oxygen or nitrogen atoms. Also, the heterocyclic radicals can be those carrying substituents such as lower alkyl, halogen (chloro, bromo, iodo or fluoro) or methoxy and also those wherein the heterocyclic atom can itself be substituted by a lower alkyl group such as a methyl group. Representative of the heterocyclic radicals defined by $R_1$ are pyridine, piperidine, furan, pyran, thiophene, 4-methyl pyridine, pyrazine, pyridine-N-oxide, pyrimidine, thiazole, imidazole and benzimidazole.

$R^1$ in the above formula can also be alkyl, cycloalkyl, alkenyl, cycloalkenyl and alkyl substituted with groups such as hydroxy, amino, carboxy or carboxylic acid esters, or alkoxy although lower alkyl radicals such as methyl, ethyl, isopropyl, butyl and pentyl, cycloalkyl or cycloalkenyl having up to seven carbon atoms in the ring; lower alkenyl radicals such as allyl and 1-(4-pentenyl), substituted lower alkyl and lower alkoxy radicals such as methoxy, ethoxy or isopropoxy are preferred.

In formula I above, when $R^2$ is alkyl it is preferable that $R^2$ be lower alkyl such as methyl, ethyl or propyl. When $R^2$ is substituted phenyl the substituents are the same as those described for $R^1$ when $R^1$ is defined as substituted phenyl.

Similarly, when $R^3$ represents alkyl it is preferred to use lower alkyl such as methyl or ethyl, propyl or isopropyl.

In the compounds of formula I wherein $R^1$ and $R^2$ can be connected together to form a saturated or unsaturated alicyclic or heterocyclic ring, the ring formed is preferably a three to seven membered carbon atom ring such as cyclopentyl, cyclohexyl, cyclohexenyl, phenylcyclohexyl, piperidyl, piperazinyl, pyridyl, or pyridyl-N-oxide. The saturated or unsaturated alicyclic or heterocyclic ring can also be substituted preferably with phenyl substituents.

In the above formula I, ($n$) will be 0 when the ether carbon atom C is joined to either $R^1$ or $R^2$ through an unsaturated bond. In all other cases ($n$) will be 1.

In formula I above where X is halogen, alkyl or alkoxy, the halogen can be fluoro, chloro, bromo or iodo but preferably fluoro or chloro, the alkyl group is preferably lower alkyl such as methyl, ethyl, propyl or isopropyl but especially methyl and the alkoxy group is preferably lower alkoxy such as methoxy, ethoxy or isopropoxy. In formula I above, $R^4$ can be hydrogen or lower alkyl such as methyl and ethyl although preferably hydrogen.

It has been found that the preferable compounds of formula I are those which exist in the levorotatory form of the erythro configuration. This is also known as the 1R,2S configuration. Also, I have found that compounds which are especially useful for reducing blood pressure are those of formula I wherein $R^2$, $R_3$, $R^4$ and X are hydrogen, $n$ is 1, and $R^1$ is hydrogen or substituted phenyl such as chlorophenyl.

Representative of the novel compounds of this invention are:

Erythro 3-(methoxy, ethoxy, isopropoxy, propoxy or t-butoxy)-α-[1-aminoethyl]-benzyl alcohol,
Erythro 3-benzyloxy-α-[1-aminoethyl]-benzyl alcohol,
Erythro 3-(α-methylbenzyloxy, p-chlorobenzyloxy, o-fluorobenzyloxy, m-bromobenzyloxy, m-chlorobenzloxy, p-fluorobenzyloxy, m-fluorobenzyloxy, p-iodobenzyloxy, m-methoxybenzyloxy, α-ethylbenzyloxy, m-isopropylbenzyloxy)-α-[1-aminoethyl]-benzyl alcohol,
Erythro 3-[allyloxy, (1-pentenyl-5-oxy), (1-butenyl-4-oxy), (1-cyclohexenyl-3d-oxy)]-α-[1-aminoethyl]-benzyl alcohol,
Erythro 3-(methoxymethyloxy, ethoxymethyloxy, isopropoxymethyloxy)-α-[1-aminoethyl]-benzyl alcohol,
Erythro 3-[(2-phenyl-1-ethyloxy), diphenylmethyloxy]-α-[1-aminoethyl]-benzyl alcohol,
Erythro 3-(cyclohexylmethyloxy, cyclopentylmethyloxy, cyclobutylmethyloxy)-α-[1-aminoethyl]-benzyl alcohol,
Erythro 3-(2-picolyloxy, 2-thienylmethyloxy, furfuryloxy, 4-picolyloxy, 2-pyranylmethyloxy, 2-piperidylmethyloxy)-α-[1-aminoethyl]-benzyl alcohol,
Erythro 5-(fluoro, chloro or methyl)-3-methoxy-α-[1-aminoethyl]-benzyl alcohol,
Erythro 6-(fluoro, chloro, bromo, ethyl, methyl)-3-methoxy-α-[1-aminoethyl]-benzyl alcohol,
Erythro 3-methoxy-α-[1-methyl or ethyl aminoethyl]-benzyl alcohol,
Erythro 4-(fluoro, chloro or methyl)-3-methoxy-α-[1-aminoethyl]-benzyl alcohol,
Erythro 3-(4-pyridyloxy, 2-pyridyloxy, 2-pyrazinyloxy)-α-[1-aminoethyl]-benzyl alcohol,
Erythro 3-[(1-phenylcyclohexyloxy), (2-phenylcyclohexyloxy), (2-phenylcyclopentyloxy)]-α-[1-aminoethyl]-benzyl alcohol,
Erythro 3-benzyloxy-5-(chloro, fluoro or methyl)-α-[1-aminoethyl]-benzyl alcohol.

In addition to the above preferred compounds, the racemic threo compounds are also intended to be included in this invention as well as the optically active forms of the erythro and threo configuration.

The novel compounds of this invention can be prepared by a number of different methods. Two such methods are illustrated by the following flow diagrams:

METHOD I

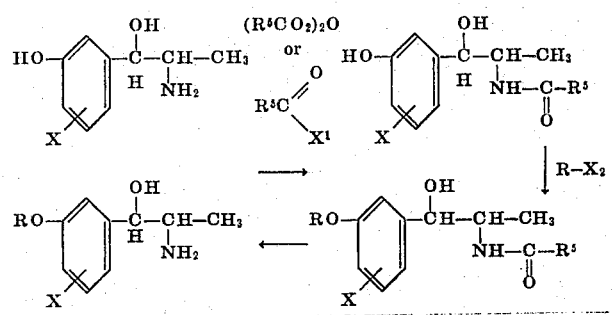

wherein $R^5$ is lower alkyl such as methyl, ethyl, propyl or isopropyl; R is the radical

wherein $R^1$, $R^2$, $R^3$, and $n$ are as defined for formula I; X is as defined in formula I, $X_1$ is chloro or bromo and $X_2$ is halogen, tosylate, mesylate, brosylate or a quarternary ammonium radical.

METHOD II

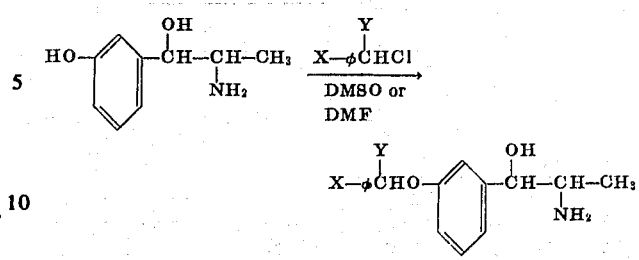

wherein X is as defined in formula I and Y is alkyl, preferably lower alkyl or hydrogen.

Method I consists of a number of steps namely an acylation, etherification and a deacylation step. The amino group of the aminoalcohol starting material is first acylated to protect it during etherification in the second step. The acylation can be carried out using an anhydride of a lower alkanoic acid or a lower alkanoyl chloride or bromide, such as acetyl chloride or benzoyl chloride. The reaction can be carried out in a solvent such as pyridine or water. Usually an excess of anhydride or acid halide is used. The acylation reaction is also carried out in the presence of a base. Any base which will neutralize the liberated acid can be used. Examples of usable bases are alkali metal hydroxides, carbonates or bicarbonates such as sodium or potassium hydroxide, carbonate or bicarbonate, alkaline earth hydroxides or tertiary amines. The reaction is carried out to completion, usually at moderate temperatures preferably temperatures of 10°–25° C. The resulting acylated material is usually isolated at this point using procedures known in the art.

The acylated intermediate produced is then allowed to react with a molar excess of the appropriately substituted halide, sulfonic ester or quarternary ammonium derivative to form the appropriately substituted acylated ether derivative. The etherification is usually carried out in an organic solvent such as acetone, methanol or ethanol and in the presence of a base. Examples of such bases are alkali metal hydroxides, (sodium or potassium hydroxide), sodium alkoxides, alkali metal carbonates such as sodium or potassium carbonate and the like.

The temperature is not critical and the reaction is usually run at a temperature of about 40° to 110° C. for a length of time sufficient to complete the reaction.

In the final step of Process I, the acylated ether is deacylated to form the desired nuclear ether. The deacylation is accomplished by heating the appropriately substituted acylated ether in an aqueous solution of a base or acid at about 60°–120° C. preferably at about 80° C. until the reaction is substantially complete. Any alkali metal hydroxide such as sodium or potassium hydroxide and any mineral acid such as a hydrohalic acid or sulfuric acid can be used to effectuate the deacylation. In addition to an aqueous solution the solvent can also be a lower alkanol such as methanol, ethanol or isopropanol.

The desired ether derivatives of 3-hydroxy-α-[1-aminoethyl]-benzyl alcohol can then be isolated from the deacylation reaction mixture by methods known in the art, one such method being extraction of the product into an inert organic, low boiling, solvent, evaporation of the solvent to dryness and recrystallization of the resulting solid material. The desired 3-ether derivatives of 3-hydroxy-α-[1-aminoethyl]-benzyl alcohol can be isolated as non-toxic salts such as a mineral acid addition salt as the hydrochloride salt, the maleate salt, the fumarate salt, the sulfate salt and the like.

In order to prepare compounds of formula I wherein X is lower alkyl or halo, one may start with the lower alkyl or halo nuclear substituted aminoalcohol. Generally, these derivatives are prepared by nitrosating the appropriate nuclear substituted propiophenone derivative to the hydroxyimino ketone followed by catalytic reduction to the amino alcohol. A detailed method for preparing both the appropriately substituted propiophenone derivative and the appropriately substituted amino alcohol is shown in the examples.

The second method of preparing 3-ether derivatives of 3-hydroxy-α-[1-aminoethyl]-benzyl alcohol is especially useful for the preparation of benzyl or substituted benzyl ethers and involves a direct one-step conversion of the amino alcohol to the desired 3-ether derivatives of 3-hydroxy-α-[1-aminoethyl]-benzyl alcohol. In this method, one reacts the amino alcohol or the appropriately nuclear substituted amino alcohol with a stoichiometric or slightly excess amount of a benzyl halide preferably benzyl chloride or benzyl bromide or substituted benzyl halide in the presence of a base strong enough to form the phenol anion of the starting compound. Such bases can be an alkali metal or alkaline earth metal base such as sodium hydroxide or a base such as sodium hydride or an alkoxide such as potassium t-butoxide. The reaction between the phenol and benzyl or substituted benzyl halide and base must be carried out in a solvent such as dimethylsulfoxide or dimethylformamide. The reaction results in excellent yields of the ether, generally about 90 percent and is completed in a short period of time usually in about one-half to 2 hours. The temperature at which the reaction is carried out can vary from about room temperature to about 100° C., but the preferable temperature is 80° C. At a temperature of 80° C. the reaction is complete in about one-half hour. Usually the benzyl halide reacts with the nitrogen of the amino alcohol but in dimethylsulfoxide or dimethylformamide the phenoxide anion reacts preferentially with the alkylating agents.

The benzyl or substituted benzyl ether derivatives of 3-hydroxy-α-[1-aminoethyl]-benzyl alcohol produced by the above method (Method II) are isolated from the reaction mixtures in a manner similar to that shown in Method I. Also, the products can be isolated in the form of their non-toxic salts.

In order to prepare the erythro form of the desired 3-ether derivatives (formula I) both processes described above should start with a starting material of the erythro configuration or of the particular configuration desired namely (1R,2S) erythro, (1S,2R) erythro, (1R,2R) threo and (1S,2S) threo. Therefore, it may be necessary to resolve the racemic 3-hydroxy-α-[1-aminoethyl]-benzyl alcohol starting material or the ether end products. Any general method for resolving amines, particularly the method of forming an optically active salt using optically active acids such as optically active tartaric acid, dibenzoyl tartaric acid, camphor sulfonic acid, or mandelic acid, and separating the diastereoisomers followed by regeneration of the optically active base can be used. Other resolution methods such as spontaneous resolution or resolution by enzymatic means are equally applicable and can also be used to isolate the erythro or threo enantiomorphs from the racemic mixtures. A preparation of the racemic threo 3-hydroxy-α-[1-aminoethyl]-benzyl alcohol used to prepare the threo ether derivatives is given in the examples.

The optically active threo isomers of 1R,2R and 1S,2S configuration may also be obtained from the racemic material by any general method for resolving amines or by isomerization of an optically active erythro 3-hydroxy-α-[1-aminoethyl]-benzyl alcohol derivative. In this isomerization, the configuration of the benzyl alcohol group is changed without affecting the configuration at the carbon atom carrying the amino group. Therefore starting from (−) erythro 3-hydroxy-α-[1-aminoethyl]-benzyl alcohol (1R,2S), one obtains (+) threo 3-hydroxy-α-[1-aminoethyl](1S,2S). The (−) threo 3-hydroxy-α-[1-aminoethyl[-benzyl alcohol (1R,2R) is then obtained from the (+) erythro amino alcohol (1S,2R).

In order to prepare the N-methyl or N-ethyl derivative of the particular 3-ether derivatives of 3-hydroxy-α-[1-aminoethyl]-benzyl alcohol, one can react the free base namely the 3-substituted-α-[1-aminoethyl]-benzyl alcohol with an acetyl halide or acetic anhydride (in the case of the N-ethyl) and with a formate such as ethyl formate or ethyl chloroformate (in the case of the N-methyl) to form the corresponding N-acyl derivative. The N-acyl derivatives are then isolated from the reaction mixture and reduced to form the desired 3-substituted-α-[1-methyl or ethyl-aminoethyl]-benzyl alcohol. The reduction can be performed with lithium aluminum hydride in a solvent such as ethyl ether or tetrahydrofuran. The reduction is run at anywhere from room temperature to the reflux temperature of the particular solvent used for a time sufficient to complete the reaction. The desired 3-ether-α-[1-methyl or ethyl-aminoethyl]-benzyl alcohol can then be isolated from the reaction mixture by methods known in the art.

The following examples illustrate this invention. They are to be construed as illustrations of the invention and not as limitations thereof.

EXAMPLE 1

(−) Erythro 3-Hydroxy-α-[1-acetamidoethyl]-benzyl Alcohol (1R,2S)

To a stirred solution of 75 g. (0.237 mole) of (−) erythro 3-hydroxy-α-[1-aminoethyl]-benzyl alcohol-(+)-hydrogen tartrate [metaraminol bitartrate] in 750 ml. of water is added 195 g. of sodium bicarbonate. The solution is cooled to 5°–10° C. and after 120 ml. of acetic anhydride has been added dropwise over 30 minutes, the reaction mixture is allowed to warm to room temperature over a 2 hour period. After stirring at room temperature for 15-20 hours, solid sodium bicarbonate is added to neutralize any remaining acid. The crude product is isolated by extraction with 3–400 ml. portions of ethyl acetate which are then combined and dried over anhydrous sodium sulfate, filtered and concentrated to a syrup. This product is added to 200 ml. of a 10 percent sodium hydroxide solution and allowed to stand at room temperature for 24 hours. After cooling in an ice bath, concentrated hydrochloric acid is added to adjust the pH of the solution to 1-2. The precipitated light tan solid is isolated by filtration and dried at 65° C. to give 49 g. of (−) erythro 3-hydroxy-α-[1-acetamidoethyl]-benzyl alcohol (1R,2S) hydrate, m.p. 95°–102b$L$ C., $[\alpha]_D^{MeOH} = (-)18.5°\,(C{=}5)$.

A sample was recrystallized three times from an ethyl acetate-hexane mixture to give a hygroscopic analytical sample which had a melting point of 122.5°–123.5° C.

Anal. — Calc. for $C_{11}H_{15}NO_3$:
C, 63.15; H. 7.23;
Found:
C, 62.73; H, 7.26.

Following the procedure above but using racemic erythro, (1S,2R) erythro, racemic threo, (1R,2R) threo or (1S,2S) threo configurations of 3-hydroxy-α-[1-aminoethyl]-benzyl alcohol in place of (−) erythro 3-hydroxy-α-[1-aminoethyl]-benzyl alcohol (1R,2S), there is obtained respectively racemic erythro, (1S,2R) erythro, racemic threo, (1R,2R) threo or (1S,2S) threo 3-hydroxy-α-[1-acetamidoethyl]-benzyl alcohol.

EXAMPLE 2

(−) Erythro 3-Methoxy-α-[aminoethyl]-benzyl Alcohol Hydrogen Maleate (1R,2S)

A stirred mixture of 15 g. (0.0719 mole) of (−) erythro 3-hydroxy-α-[1-acetamidoethyl]-benzyl alcohol (1R,2S), 30 g. of anhydrous potassium carbonate, 13.2 g. of dimethylsulfate and 500 ml. of acetone is heated at reflux for 8 hours. Inorganic salts are removed by filtration. The acetone solution is concentrated under vacuum to an oily residue which is then heated at reflux for 24 hours with 50 ml. of a 10 percent sodium hydroxide solution and 150 ml. of ethanol. The reaction mixture is concentrated under vacuum to remove most of the ethanol and water is added to bring the total volume to about 100 ml. After saturating with sodium chloride, the crude product is extracted into 3-100 ml. portions of ethyl acetate. The ethyl acetate extracts are combined, dried over anhydrous sodium sulfate, filtered and concentrated. The residue, 13 g., is dissolved in ethanol, treated with 15 g. of maleic acid and the hydrogen maleate salt precipitated with ethyl ether to give 10.4 g. (48.8 percent) of the methoxy derivative, m.p. 153.4°–155.9° C. dec. Recrystallization from an ethanol-ethyl ether mixture gives an analytical sample, m.p. 153.4°–154.4° C. dec., $[\alpha]_D^{H_2O} = (-)24°\,(C{=}2)$.

Anal. — Calc. for $C_{14}H_{19}NO_6$:
C, 56.56; H, 6.44; N, 4.70;

Found:

C, 56.62; H, 6.15; N, 5.01.

Following the procedure above but using an equivalent amount of racemic erythro, (1S,2R) erythro, racemic threo, (1R,2R) threo or (1S,2S) threo 3-hydroxy-α-[1-acetamidoethyl]-benzyl alcohol in place of (−) erythro 3-hydroxy-α-[1-acetamidoethyl]-benzyl alcohol (1R,2S), there is produced respectively racemic erythro, (1S,2R) erythro, racemic threo, (1R,2R) threo or (1S,2S) threo 3-methoxy-α-[1-aminoethyl]-benzyl alcohol.

EXAMPLE 3

(−) Erythro 3-Benzyloxy-α-[1-acetamidoethyl]-benzyl Alcohol (1R,2S)

A mixture of 7.5 g. (0.0330 mole) of (−) erythro 3-hydroxy-α-[1-acetamidoethyl]-benzyl alcohol hydrate (1R,2S), 15 g. of anhydrous potassium carbonate, 6.9 g. of benzyl bromide and 200 ml. of acetone is stirred for 24 hours at reflux. After cooling, the reaction mixture is filtered free of inorganic material and most of the acetone solvent removed under vacuum. Water is added to the residue and the precipitated solid filtered and dried to give 8.2 g. (82.8 percent) of (−) erythro 3-benzyloxy-α-[1-acetamidoethyl]-benzyl alcohol (1R,2S), m.p. 137.0°–140.0° C. Recrystallization from an ethyl acetate-hexane mixture gives an analytical sample, m.p. 138.0°–140.0° C.

Anal. — Calc. for $C_{18}H_{21}NO_3$:

C, 72.21; H, 7.07;

Found:

C, 72.50; H, 6.93.

Following the procedure above but using an equivalent amount of racemic erythro, (1S,2R) erythro, racemic threo, (1R,2R) threo or (1S,2S) threo 3-hydroxy-α-[1-acetamidoethyl]-benzyl alcohol in place of (−) erythro 3-hydroxy-α-[1-acetamidoethyl]-benzyl alcohol hydrate (1R,2S), there is produced respectively racemic erythro, (1S,2R) erythro, racemic threo, (1R,2R) threo or (1S,2S) threo 3-benzyloxy-α-[1-acetamidoethyl]-benzyl alcohol.

EXAMPLE 4

(−) Erythro 3-Benzyloxy-α-[1-aminoethyl]-benzyl Alcohol Hydrogen Maleate (1R,2S)

A solution of 12.1 g. (0.0405 mole) of (−) erythro 3-benzyloxy-α-[1-acetamidoethyl]-benzyl alcohol (1R,2S) in 150 ml. of ethanol and 50 ml. of a 10 percent sodium hydroxide solution is heated 24 hours at reflux and then concentrated under vacuum to remove most of the ethanol. Water is added and the product extracted into 3–100 ml. portions of ethyl acetate. The ethyl acetate extracts are combined, dried over anhydrous sodium sulfate, filtered and concentrated to give 10.6 g. of an oil. This crude product is dissolved in ethanol and treated with 6.0 g. of maleic acid. The hydrogen maleate salt of (−) erythro 3-benzyloxy-α-[1-aminoethyl]-benzyl alcohol (1R,2S) is precipitated with ethyl ether. Recrystallization from an ethanol-ethyl ether mixture gives 5.3 g. (35.2 percent) of essentially pure (−) erythro 3-benzyloxy-α-[1-aminoethyl]-benzyl alcohol hydrogen maleate, m.p. 157.8°–159.8° C. dec., $[\alpha]_D^{MeOH} = (-)23°$ (C=2).

Anal. — Calc. for $C_{20}H_{23}NO_6$:

C, 64.33; H, 6.21; N, 3.75;

Found:

C, 64.51; H, 6.06; N, 3.91.

Following the procedure above but using racemic erythro, (1S,2R) erythro, racemic threo, (1R,2R) threo or (1S,2S) threo 3-benzyloxy-α-[1-acetamidoethyl]-benzyl alcohol in place of the particular benzyl alcohol used above, there is produced respectively racemic erythro, (1S,2R) erythro, racemic threo, (1R,2R) threo or (1S,2S) threo 3-benzyloxy-α-[1-aminoethyl]-benzyl alcohol.

EXAMPLE 5

Following the procedure of Examples 1, 2, 3 and 4 but substituting equimolar amounts of the appropriate R-halide or R-tosylate or mesylate wherein R is defined as in Method 1 in place of the corresponding reactant used in Examples 2 and 3, there are obtained the compounds shown in the following table. The (1S,2R) erythro, (1R,2R) threo, (1S,2S) threo or the erythro or threo racemates of the desired compounds listed below can also be obtained by starting the reaction sequence with the appropriate isomer of the starting material.

| Erythro 3-[R]-α-(1-aminoethyl)-benzyl alcohol hydrogen maleate, R is | Melting point, °C. | $[\alpha]_D$ C=2, degree | Solvent | Calculated | | | Found | | |
|---|---|---|---|---|---|---|---|---|---|
| | | | | C | H | N | C | H | N |
| Ethoxy | 144.9–145.9 | −18 | $H_2O$ | 57.86 | 6.79 | 4.49 | 58.12 | 6.81 | 4.54 |
| Isopropoxy | 125.0–126.3 | −18 | $H_2O$ | 59.06 | 7.13 | 4.31 | 58.70 | 6.95 | 4.30 |
| Butoxy | 132.9–134.4 | −16 | $H_2O$ | 60.16 | 7.42 | 4.12 | 59.77 | 7.05 | 4.23 |
| Allyloxy | 140.5–142.0 | −19 | $H_2O$ | 59.43 | 6.55 | 4.33 | 59.30 | 6.51 | 4.48 |
| Cyclopropylmethyloxy | 152.0–153.0 | −17 | $H_2O$ | 60.52 | 6.87 | 4.15 | 60.06 | 6.63 | 4.04 |
| Methoxymethyloxy | 155.8–158.3 | −22 | $H_2O$ | 55.03 | 6.46 | 4.27 | 55.46 | 6.45 | 4.20 |
| 2-phenyl-1-ethyloxy | 135.5–137.5 | −18 | $CH_3OH$ | 65.10 | 6.50 | 3.61 | 65.01 | 6.33 | 3.85 |
| Diphenylmethyloxy | 187.9–189.9 | −12 | $CH_3SOCH_3$ | 69.47 | 6.05 | 3.11 | 69.26 | 6.01 | 3.08 |
| o-Chlorobenzyloxy | 152.8–154.5 | −19 | $CH_3OH$ | 58.89 | 5.43 | 3.43 | 59.10 | 5.45 | 3.57 |
| m-Chlorobenzyloxy | 155.8–157.5 | −21 | $CH_3OH$ | 58.89 | 5.43 | 3.43 | 58.89 | 5.46 | 3.66 |
| p-Chlorobenzyloxy | 165.2–167.2 | −19 | $CH_3OH$ | 58.89 | 5.43 | 3.43 | 58.80 | 5.34 | 3.38 |
| α-Methylbenzyloxy | 189.4–190.4 | −18 | $H_2O$ | 65.10 | 6.50 | 3.61 | 64.75 | 6.21 | 3.58 |
| m-Fluorobenzyloxy | 137.0–139.5 | −29 | $CH_3OH$ | 61.37 | 5.66 | 3.57 | 61.34 | 5.52 | 3.58 |
| Cyclohexylmethyloxy | 166.5–168.5 | −20 | $CH_3OH$ | 63.30 | 7.70 | 3.69 | 63.07 | 7.49 | 3.82 |
| 2-picolyloxy [di-(hydrogen maleate)]. | 144.4–147.4 | −13 | $CH_3OH$ | 56.32 | 5.34 | 5.71 | 56.06 | 5.28 | 5.87 |
| 2-thienylmethyloxy | 141.0–144.0 | −21 | $CH_3OH$ | 56.97 | 5.57 | 3.69 | 57.21 | 5.51 | 3.96 |

Also the erythro and threo forms of the following compounds and their pure enantiomers can be prepared by following the procedures of Examples 1, 2, 3 and 4:

3-Propoxy-α-[1-aminoethyl]-benzyl Alcohol 3-(p-Fluorobenzyloxy)-α-[1-aminoethyl]-benzyl Alcohol 3-(o-Fluorobenzyloxy)-α-[1-aminoethyl]-benzyl Alcohol 3-(m-Methoxybenzyloxy)-α-[1-aminoethyl]-benzyl Alcohol 3-(Cyclopentylmethyloxy)-α-[1-aminoethyl]-benzyl Alcohol 3-(4-Picolyloxy)-α-[1-aminoethyl]-benzyl Alcohol 3-(3-Thienylmethyloxy)-α-[1-aminoethyl]-benzyl Alcohol 3-(4-Pyridyloxy)-α-[1-aminoethyl]-benzyl Alcohol 3-(2-Pyridyloxy)-α-[1-aminoethyl]-benzyl Alcohol 3-(2-Pyrazinyloxy)-α-[1-aminoethyl]-benzyl Alcohol 3-(2-Phenylcyclohexyloxy)-α-[1-aminoethyl]-benzyl Alcohol 3-(1-Cyclohexenyl-3-oxy)-α-[1-aminoethyl]-benzyl Alcohol 3-(α-Ethylbenzyloxy)-α-[1-aminoethyl]-benzyl Alcohol 3-(m-Chloro-α-methylbenzyloxy)-α-[1-aminoethyl]-benzyl Alcohol 3-(m-Fluoro-α-methylbenzyloxy)-α-[1-aminoethyl]-benzyl Alcohol

EXAMPLE 6

Erythro 3-Methoxy-6-methyl-α-[1-aminoethyl]-benzyl Alcohol

A mixture of 1.5 g. (0.0044 mole) of 3-methoxy-6-methyl-α-aminopropiophenone hydrochloride and 0.5 g. of a 10 percent palladium on carbon catalyst in 30 ml. of water is hydrogenated at atmospheric pressure and 25° until one equivalent of hydrogen has been adsorbed. The reaction mixture is filtered and concentrated under vacuum to give a white solid, which after two recrystallizations from an ethanol-ethyl ether mixture affords 1.3 g. (87 percent) of the desired erythro 3-methoxy-6-methyl-α-[1-aminoethyl]-benzyl alcohol hydrochloride, m.p. 249.0°–250.0° C. dec..

Anal. — Calc. for $C_{11}H_{18}ClNO_2$:
C, 57.01; H, 7.83; N, 6.05;
Found:
C, 57.37; H, 7.52; N, 6.05.

The 3-methoxy-6-methyl-α-aminopropiophenone is prepared from 2-bromo-4-methoxy toluene by the following sequence of steps:

3-Methoxy-6-methylpropiophenone — A solution of 3.8 g. (0.069 mole) of propionitrile in 25 ml. of anhydrous ethyl ether is added dropwise to a stirred solution of the Grignard reagent prepared from 13.8 g. (0.069 mole) of 2-bromo-4-methoxy toluene and 1.7 g. (0.069 g.-atoms) of magnesium turnings in 100 ml. of anhydrous ethyl ether. After addition is complete, the reaction is heated an additional 15 hours at reflux. The reaction mixture is then cooled to 0° C. and treated with 50 ml. of cold concentrated hydrochloric acid. The aqueous acid layer is separated and heated at reflux for 90 minutes and then cooled to room temperature and extracted with 250 ml. of ethyl ether. The ether extract is dried over anhydrous sodium sulfate, filtered and concentrated to a dark oil. Distillation through a short Vigreux column gives 3.5 g. (28.5 percent) of 3-methoxy-6-methylpropiophenone, b.p. 146.0°–147.0° C. at 18 mm. mercury pressure. A center fraction was redistilled for analysis.

Anal. — Calc. for $C_{11}H_{14}O_2$:
C, 74.12; H, 7.91;
Found:
C, 73.75; H, 7.80.

3-Methoxy-6-methyl-α-hydroxyiminopropiophenone — A solution of 2.1 g. (0.018 moles) of freshly distilled isoamyl nitrite in 50 ml. of anhydrous ethyl ether is added dropwise to a solution of 3.0 g. (0.017 mole) of 3-methoxy-6-methyl-propiophenone in 50 ml. of anhydrous ethyl ether at room temperature. Dry hydrogen chloride gas is bubbled continuously through the reaction mixture during the addition and for an additional one-half hour after addition is complete. The reaction mixture is then stirred at room temperature for 3 hours. The excess hydrogen chloride and ether solvent are removed under vacuum and the resulting solid is washed with hexane and dried at 65° C. to yield 2.6 g. (75 percent) of the desired oxime, m.p. 135.0°–138.0° C. An analytical sample with the same melting point was obtained by recrystallization from a methanol-hexane mixture.

Anal. — Calc. for $C_{11}H_{13}NO_3$:
C, 63.75; H, 6.32; N, 6.75;
Found:
C, 63.82; H, 5.98; N, 6.90.

3-Methoxy-6-methyl-α-aminopropiophenone Hydrochloride — A mixture of 3.0 g. (0.028 mole) of 3-methoxy-6-methyl-α-hydroxyiminopropiophenone in 100 ml. of a 2 N ethanolic-hydrogen chloride solution and 0.5 g. of a 5 percent palladium on carbon catalyst is hydrogenated at 25° and atmospheric pressure until 2 equivalents of hydrogen are taken up. The catalyst is then removed by filtration and the solvent evaporated under vacuum. The residue is recrystallized from a methanol-ethyl acetate mixture to give 3.0 g. (46 percent) of 3-methoxy-6-methyl-α-aminopropiophenone hydrochloride, m.p. 179.7°–182.7° C. dec..

Anal. — Calc. for $C_{11}H_{16}ClNO_2$:
C, 57.51; H, 7.02; N, 6.09;
Found:
C, 57.56; H, 6.96; N, 6.26.

The racemic erythro 3-methoxy-6-methyl-α-[1-aminoethyl]-benzyl alcohol prepared in the manner above can then be resolved into the levorotatory enantiomorph by means known in the art. One such means is as follows:

The free base of the racemic 3-methoxy-6-methyl-α-[1-aminoethyl]-benzyl alcohol is dissolved in a suitable alcohol solvent and an equivalent amount of an optically active acid such as (+)-tartaric acid dissolved in the same solvent is added. The precipitate is filtered and recrystallized to give one of the two possible diastereoisomers. The other diastereoisomer can be obtained from the mother liquors and purified by recrystallization from a suitable solvent. The optically active erythro 3-methoxy-α-[1-aminoethyl]-benzyl alcohol compounds can be obtained free of tartaric acid by treatment with a base such as sodium carbonate or sodium hydroxide.

Following the procedure of Example 6 but using equivalent amounts of 3-ethoxy-6-ethyl-α-aminopropiophenone, 3-methoxy-6-isopropyl-α-aminopropiophenone or 3-methoxy-6-butyl-α-aminopropiophenone in place of 3-methoxy-6-methyl-α-aminopropiophenone, there is produced respectively 3-ethoxy-6-ethyl-α-[1-aminoethyl]-benzyl alcohol and 3-methoxy-6-[isopropyl or butyl]-α-[1-aminoethyl]-benzyl alcohol.

EXAMPLE 7

Erythro 5-Fluoro-3-methoxy-α-[1-aminoethyl]-benzyl Alcohol Hydrochloride

A mixture of 1.5 g. (0.0071 mole) of 5-fluoro-3-methoxy-α-hydroxyiminopropiophenone in 200 ml. of a 2 N ethanolic-hydrogen chloride solution and 0.5 g. of a 10 percent palladium on carbon catalyst is hydrogenated at atmospheric pressure and room temperature until two equivalents of hydrogen have been adsorbed. The reaction mixture is filtered and concentrated and the residue dissolved in 60 ml. of water. Fresh palladium on carbon catalyst, 0.5 g., is added and the hydrogenation is continued until one more equivalent of hydrogen has been taken up. The reaction mixture is filtered and concentrated to a solid which after several recrystallizations from an ethanol-ethyl ether mixture affords 0.9 g. (53 percent) of the desired erythro 5-fluoro-3-methoxy-α-[1-aminoethyl]-benzyl alcohol hydrochloride, m.p. 145.4°–148.4 °C. dec.

Anal. — Calc. for $C_{10}H_{15}ClFNO_2$:
C, 50.96; H, 6.42; N, 5.94; Cl, 15.04;
Found:
C, 50.45; H, 6.28; N, 6.42; Cl, 15.41.

The corresponding 5-fluoro-3-methoxy-α-hydroxyiminopropiophenone is prepared from m-fluoro anisole by the following sequence of steps:

4-Bromo-5-fluoronanisole — A solution of 128 g. (0.80 moles) of bromine in 200 ml. of chloroform is added dropwise to a stirred solution of 100 g. (0.793 moles) of m-fluoro anisole in 100 ml. of chloroform at room temperature. After addition is complete, the reaction mixture is heated 8 hours at reflux and then stirred overnight at room temperature. The resulting solution is washed with 400 ml. of water and 300 ml. of a 10 percent sodium hydroxide solution. The chloroform extract is dried over anhydrous sodium sulfate, filtered and concentrated. The residue is distilled through a short Vigreux column to give 149 g. (91 percent) of 4-bromo-5-fluoroanisole, b.p. 109°–110° C. Gas chromatography indicates that the product is homogeneous.

3-Amino-5-fluoranisole Hydrochloride is prepared from 4-bromo-5-fluoroanisole by the same procedure used for the preparation of 3-amino-5-methylanisole (see Example 8). Recrystallization of the crude hydrochloride from a methanol-ethyl acetate solvent mixture gives a 55 percent yield of 3-amino-5-fluoroanisole hydrochloride, m.p. 220.0°–227.0° C. dec.

Anal. — Calc. for $C_7H_9ClFNO$:
C, 47.33; H, 5.10; N, 7.88;
Found:
C, 47.19; H, 4.89; N, 7.83.

3-Bromo-5-fluoroanisole is prepared from 3-amino-5-fluoroanisole by the same procedure used for the preparation of 3-bromo-5-methylanisole (see Example 8) and is obtained in 66 percent yield, b.p. 93°–94° C. at 16–17 mm. Gas chromatography indicates that the product is homogeneous.

5-Fluoro-3-methoxypropiophenone — A solution of 3.3 g. (0.057 mole) of propionaldehyde in 50 ml. of dry peroxide-free tetrahydrofuran is added dropwise to a stirred solution of the Grignard reagent prepared from 11.7 g. (0.057 mole) of 3-bromo-5-fluoroanisole and 1.3 g. (0.057 g. atoms) of magnesium turnings in 50 ml. of tetrahydrofuran. The reaction mixture is heated at reflux during the addition and then for an additional 15 hours after addition is complete. After pouring the reaction mixture onto a mixture of ice and concentrated hydrochloric acid, the crude product is extracted into 500 ml. of ethyl ether. The ether extract is washed with water, dried over anhydrous sodium sulfate, filtered and concentrated under vacuum. The residual oil is distilled through a short Vigreux column to give 2.9 g. (30 percent) of 1-(5-fluoro-3-methoxyphenyl)-1-propanol, b.p. 134°–7° C. at 15 mm. A solution of 1.3 g. (0.013 mole) of chromium trioxide in 20 ml. of water containing 1.1 ml. of concentrated sulfuric acid is added dropwise to a stirred and cold (5°) solution of 2.3 g. (0.013 moles) of the alcohol in 25 ml. of acetone. The reaction mixture is stirred for an additional 6 hours during which time the reaction temperature is allowed to slowly rise to room temperature. After saturating the reaction solution with sodium chloride, the reaction mixture is extracted with several portions of ethyl ether. The ether extracts are combined, dried over anhydrous sodium sulfate, filtered and concentrated under vacuum to give 2.3 g. (98 percent) of 5-fluoro-3-methoxypropiophenone as a light green oil.

5-Fluoro-3-methoxy-α-hydroxyiminopropiophenone, m.p. 107.3°–109.8° C., is prepared in 50 percent yield by the nitrosation of 5-fluoro-3-methoxypropiophenone by the same procedure used for the preparation of 3-methoxy-6-methyl-α-hydroxyiminopropiophenone (see Example 6).

Following the procedure of Example 7 but using equivalent amounts of 5-chloro-3-methoxy-α-hydroxyiminopropiophenone and 5-bromo-3-methoxy-α-hydroxyiminopropiophenone in place of 5-fluoro-3-methoxy-α-hydroxyiminopropiophenone, there is produced erythro 5-[chloro or bromo]-3-methoxy-α-[1-aminoethyl]-benzyl alcohol.

The erythro compounds prepared above can be resolved into their enantiomorphs by methods known in the art.

EXAMPLE 8

Erythro 3-Methoxy-5-methyl-α-[1-aminoethyl]-benzyl Alcohol Hydrochloride

Racemic erythro 3-methoxy-5-methyl-α-[1-aminoethyl]-benzyl alcohol hydrochloride, m.p. 169.7°–172.2° C. dec., is prepared in 51 percent yield from 3-methoxy-5-methyl-α-hydroxyiminopropiophenone by the same method used for the preparation of the corresponding 5-fluoro derivative (see Example 7).

Anal. — Calc. for $C_{11}H_{18}ClNO_2$:
C, 57.01; H, 7.83; N, 6.05; Cl, 15.30;
Found:
C, 56.29; H, 7.80; N, 6.08; Cl, 15.28.

The corresponding 3-methoxy-5-methyl-α-hydroxyiminopropiophenone is prepared from 2-chloro-5-methylanisole by the following sequence of steps:

3-Amino-5-methylanisole Hydrochloride — A solution of 15.7 g. (0.10 mole) of 2-chloro-5-methylanisole in 50 ml. of petroleum ether (30°–60°) is added over a period of 1 hour to a stirred solution of sodium amide, prepared from 9.2 g. (0.40 mole) of sodium, in 500 ml. of liquid ammonia. After stirring at liquid ammonia temperature for 3 hours, 30 g. of ammonium chloride and 100 ml. of benzene are added and the excess ammonia is allowed to evaporate overnight. The brown residue is washed with benzene which is then extracted with 500 ml. of 1 N hydrochloric acid. The acid extracts are cooled and treated with a 40 percent sodium hydroxide solution until strongly basic. The crude product is extracted into 300 ml. of ethyl ether which is then dried over anhydrous sodium sulfate, filtered and concentrated. The residual oil is dissolved in methanol, treated with an ethanolic-hydrogen chloride solution and diluted with ethyl acetate. A pink precipitate forms which is recrystallized twice from methanol-ethyl acetate to give 12.3 g. (71 percent) of the desired 3-amino-5-methylanisole hydrochloride, m.p. 265° C. dec.

3-Bromo-5-methylanisole — A solution of 4.9 g. (0.071 moles) of sodium nitrite in 25 ml. of water is added over 1 hour to a stirred solution of 12.3 g. (0.071 moles) of 3-amino-5-methylanisole in 75 ml. of freshly distilled 48 percent hydrobromic acid maintained at a temperature of less than 5° with an external sodium chloride-ice bath. The resulting mixture is immediately added in portions to a hot solution of 6.7 g. (0.047 mole) of cuprous bromide in 50 ml. of freshly distilled 48 percent hydrobromic acid. After addition is complete, the reaction mixture is steam distilled and 800 ml. of distillate are collected. The distillate is extracted with 400 ml. of benzene which is then washed with a 5 percent sodium hydroxide solution, a 3 N hydrochloric acid solution and water. The benzene extract is dried over anhydrous sodium sulfate, filtered and concentrated. The residue is distilled through a short Vigreux column to give 3.1 g. (22 percent) of 3-bromo-5-methylanisole, b.p. 119°–122° C. at 20 mm. pressure. Gas chromatography indicates that the product is 93 percent pure.

3-Methoxy-5-methylpropiophenone is prepared from 3-bromo-5-methylanisole in 40 percent yield by the procedure used for the preparation of the 6-methyl derivative (see Example 6). Gas chromatography shows that the product, b.p. 150°–155° C. at 17 mm. mercury pressure is homogeneous.

3-Methoxy-5-methyl-α-hydroxyiminopropiophenone is prepared in 57 percent yield from 3-methoxy-5-methylpropiophenone by the same procedure used for the preparation of the 6-methyl derivative (see Example 6). An analytical sample, m.p. 106.0°–110.0° C., is obtained by recrystallization from a methanol-hexane mixture.

Anal. — Calc. for $C_{11}H_{13}NO_3$:
C, 63.75; H, 6.32; N, 6.76;
Found:
C, 63.16; H, 6.13; N, 6.74.

Following the procedure of Example 8 but using equivalent amounts of 3-methoxy-5-ethyl-α-hydroxyiminopropiophenone and 3-methoxy-5-isopropyl-α-hydroxyiminopropiophenone in place of 3-methoxy-5-methyl-α-hydroxyiminopropiophenone used above, there is produced respectively erythro 3-methoxy-5-[ethyl or isopropyl]-α-[1-aminoethyl]-benzyl alcohol.

The erythro compounds prepared above can be resolved into their enantiomorphs by methods known in the art and previously described.

EXAMPLE 9

Other nuclear substituted analogs of the compounds shown in formula I can be prepared by following the procedures described in Examples 6, 7 and 8 above but substituting equimolar amounts of other nuclear substituted starting materials, the following desired end products can thus be prepared:

Erythro 3-methoxy-5-chloro-α-[1-aminoethyl]-benzyl alcohol
Erythro 3-methoxy-4-chloro-α-[1-aminoethyl]-benzyl alcohol
Erythro 3-ethoxy-4-chloro-α-[1-aminoethyl]-benzyl alcohol
Erythro 3,5-dimethoxy-α-[1-aminoethyl]-benzyl alcohol
Erythro 3-methoxy-5-trifluoromethyl-α-[1-aminoethyl]-benzyl alcohol
Erythro 3-ethoxy-5-trifluoromethyl-α-[1-aminoethyl]-benzyl alcohol
Erythro 3-methoxy-5-phenyl-α-[1-aminoethyl]-benzyl alcohol
Erythro 3-methoxy-6-phenyl-α-[1-aminoethyl]-benzyl alcohol

EXAMPLE 10

(−) Erythro 3-Benzyloxy-α-[1-aminoethyl]-benzyl Alcohol Hydrogen Maleate (1R,2S)

A stirred mixture of 2.0 g. (0.012 mole) of (−) erythro 3-hydroxy-α-[1-aminoethyl]-benzyl alcohol, 100 ml. of dimethylsulfoxide and 6.0 ml. of a 2 N sodium hydroxide solution is heated to 85°. A solution of 2.1 g. (0.013 mole) of benzyl bromide in 10 ml. of dimethylsulfoxide is added slowly to the reaction mixture and the resulting mixture is stirred at 85° for 2 hours and then poured into 500 ml. of ice and water. The resulting solution is saturated with sodium chloride, extracted with 4 × 200 ml. portions of ethyl acetate and the organic extracts combined. After drying over anhydrous sodium sulfate, filtering and concentrating, 3.9 g. of crude erythro 3-benzyloxy-α-[1-aminoethyl]-benzyl alcohol is obtained. This crude product is dissolved in warm ethanol and treated with 5.8 g. of maleic acid. Upon dilution with ethyl ether, 3.5 g. (97 percent) of (−) erythro 3-benzyloxy-α-[1-aminoethyl]-benzyl alcohol hydrogen maleate, m.p. 149°–52° precipitates. Recrystallization from an ethanol-ethyl ether mixture gives 3.2 g. (90 percent), m.p. 150.0°–154.0° of (−) erythro 3-benzyloxy-α-[1-aminoethyl]-benzyl alcohol hydrogen maleate.

Following the procedure above but using an equimolar amount of benzyl chloride, m-chlorobenzyl bromide, p-chlorobenzyl bromide, o-chlorobenzyl bromide or m-fluorobenzyl bromide in place of benzyl bromide therein used, there is obtained (−) erythro 3-[benzyloxy, m-chlorobenzyloxy, p-chlorobenzyloxy, o-chlorobenzyloxy or m-fluorobenzyloxy]-α-[1-aminoethyl]-benzyl alcohol (1R,2S).

EXAMPLE 11

(−) Erythro 3-benzyloxy-α-[1-ethylaminoethyl]-benzyl Alcohol (1R,2S)

A stirred solution of 2.6 g. of (−) erythro 3-benzyloxy-α-[1-aminoethyl]-benzyl alcohol in 25 ml. of pyridine is cooled to 5°–10 C. and 1.1 g. of acetic anhydride is added dropwise. After stirring at room temperature, excess pyridine is removed under reduced pressure and the crude erythro 3-benzyloxy-α-[1-acetamidoethyl]-benzyl alcohol is isolated by extraction into ethyl acetate. The extract is washed with dilute hydrochloric acid, dried over anhydrous sodium sulfate, filtered and concentrated to give the N-acetyl derivative.

The erythro 3-benzyloxy-α-[1-acetamidoethyl]-benzyl alcohol is then dissolved in 25 ml. of ethyl ether and added to a solution of 0.5 gms. of lithium aluminum hydride in 50 ml. of ethyl ether. The reaction mixture is heated at reflux for 12 hours. Water is added slowly to destroy any excess lithium aluminum hydride and the reaction mixture is then concentrated to a low volume. (−) Erythro 3-benzyloxy-α-[1-ethylaminoethyl]-benzyl alcohol (1R,2S) is then isolated from the reaction mixture.

(−) Erythro 3-benzyloxy-α-[1-methylaminoethyl]-benzyl alcohol (1R,2S) can be prepared by reducing (−) erythro 3-benzyloxy-α-[1-formamidoethyl]-benzyl alcohol in a manner similar to that described above. The (−) erythro 3-benzyloxy-α-[1-formamidoethyl]-benzyl alcohol can be prepared by reacting (−) erythro 3-benzyloxy-α-[1-aminoethyl]-benzyl alcohol with an excess of ethyl formate.

Other N-methyl or N-ethyl derivatives of 3-substituted-α-[1-aminoethyl]-benzyl alcohol can be prepared by using an equivalent amount of 3-substituted-α-[1-aminoethyl]-benzyl alcohol in place of 3-benzyloxy-α-[1-aminoethyl]-benzyl alcohol used above and following the procedures described above.

EXAMPLE 12

Preparation of Racemic Threo 3-hydroxy-α-[1-aminoethyl]-benzyl Alcohol Fumarate m-Benzyloxy-α-bromopropiophenone — A solution of 32.5 g. (0.203 mole) of bromine in 50 ml. of methylene chloride is added over three-fourths hour to a stirred solution of 50 g. (0.208 mole) of m-benzyloxypropiophenone in 500 ml. of methylene chloride. Nitrogen is bubbled through the reaction during the addition and for an additional 3 hours after addition is complete. The methylene chloride solution is washed with an aqueous sodium bicarbonate solution and dried over anhydrous sodium sulfate. After filtering the drying agent, methylene chloride solvent is evaporated under reduced pressure and the residue is dissolved in ethyl ether. The ether solution is washed with a 5 percent sodium hydroxide solution and water and then dried over anhydrous sodium sulfate and filtered. Removal of the ether solvent and recrystallization of the residue from hexane gives 50.5 g. (78 percent) of the α-bromo ketone, m.p. 46.5°–49.0°.

Anal. — Calc. for $C_{16}H_{15}BrO_2$:
C, 60.20; H, 4.74; Br, 25.04;
Found:
C, 59.96; H, 4.58; Br, 25.36.

m-Benzyloxy-α-dibenzylaminopropiophenone Hydrochloride — A solution of 33.5 g. (0.105 mole) of m-benzyloxy-α-bromopropiophenone and 43.4 g. (0.220 mole) of dibenzylamine in 400 ml. of absolute ethyl alcohol is stirred at reflux for 6 hours. The cooled reaction mixture is filtered and the filtrate concentrated under reduced pressure. The residue is extracted with ethyl ether which is then washed with water and dried over anhydrous sodium sulfate. After filtering and concentrating, the residue is dissolved in ethyl acetate, treated with an ethanolic-hydrogen chloride solution and cooled. A small amount of dibenzylamine hydrochloride is removed by filtration. Ethyl ether is added to the filtrate to precipitate 17.0 g. (34.4 percent) of m-benzyloxy-α-dibenzylaminopropiophenone hydrochloride, m.p. 142.9°–145.9°. An analytical sample is obtained by further recrystallization from an ethyl acetate-hexane mixture.

Anal. — Calc. for $C_{30}H_{30}ClNO_2$:
C, 76.33; H, 6.41; N, 2.97;
Found:
C, 76.29; H, 6.06; N, 3.21.

Threo m-Benzyloxy-α-[1-dibenzylaminoethyl]-benzyl Alcohol — M-Benzyloxy-α-dibenzylaminopropiophenone hydrochloride, 4.26 g. (9.03 mmole) is converted to the free base by shaking in a separatory funnel with 25 ml. of water, 5 ml. of a 10 percent sodium hydroxide solution and 50 ml. of ethyl ether until all of the solid has dissolved. The ethyl ether extract is washed with water and dried over anhydrous magnesium sulfate. The filtered ethyl ether extract is added over one-half hour to a well stirred mixture of 0.3 g. of lithium aluminum hydride and 20 ml. of dry ethyl ether under nitrogen. After stirring for 4 hours at reflux, the reaction mixture is cooled in an ice bath and excess lithium aluminum hydride is decomposed with a saturated sodium-potassium tartrate solution. The resulting viscous aqueous mixture is extracted several times with ethyl acetate. The combined ethyl acetate extracts are washed with a saturated sodium chloride solution, dried over anhydrous sodium sulfate and filtered. Solvent is evaporated under reduced pressure to give 3.2 g. (81.0 percent) of the threo alcohol, m.p. 117.6°–122.1°; soften at 115°. Recrystallization from a benzene-hexane solvent mixture followed by recrystallization from methanol gives 2.4 g. (60.7 percent) of threo m-benzyloxy-α-[1-dibenzylaminoethyl]-benzyl alcohol, m.p. 122.6°–124.6°.

Anal. — Calc. for $C_{30}H_{31}NO_2$:
C, 82.34; H, 7.14; N, 3.20;
Found:
C, 81.89; H, 6.80; N, 3.20.

Threo m-hydroxy-α-(1-aminoethyl)-benzyl Alcohol Fumarate — A mixture of 1.0 g. of a 5 percent palladium on carbon catalyst and 2.15 g. (4.92 mmole) of threo m-benzyloxy-α-(1-dibenzyl-aminoethyl)-benzyl alcohol in 50 ml. of absolute ethanol containing 1.0 ml. of an 8 N ethanolic-hydrogen chloride solution is hydrogenated at 25° and atmospheric pressure. After 15 minutes, two equivalents of hydrogen are absorbed. The palladium catalyst is removed by filtration and replaced by 1.0 g. of a 5 percent palladium on alumina catalyst. One more equivalent of hydrogen is taken up smoothly at 52° and atmospheric pressure. The catalyst is removed by filtration and the ethanol solvent evaporated under reduced pressure. The residue is dissolved in water, neutralized with sodium bicarbonate, saturated with sodium chloride and extracted several times with ethyl acetate. The ethyl acetate extracts are combined, dried over anhydrous sodium sulfate, filtered and concentrated to 0.1 g. of an oil. An additional 0.33 g. of crude product is obtained by evaporating the aqueous extract to dryness under reduced pressure and extracting the residue with hot ethyl acetate. Treatment of the crude product with an equivalent amount of fumaric acid in ethanol and ethyl acetate gives the fumarate salt of threo m-hydroxy-α-[1-aminoethyl]-benzyl alcohol, m.p. 212.4°–214.4° dec. Further recrystallization from a methanol-ethyl acetate solvent mixture gives an analytical sample, m.p. 215.4°–216.4° dec.

Anal. — Calc. for $C_{22}H_{30}N_2O_8$:
C, 58.65; H, 6.71; N, 6.22;
Found:
C, 58.29; H, 6.66; N, 6.64.

EXAMPLE 13

(−) (1R,2R) Threo m-Hydroxy-α-[1-aminoethyl]-benzyl Alcohol Fumarate

A total of 5.0 g. (0.0239 mole) of (+) erythro m-hydroxy-α-[1-acetamidoethyl]-benzyl alcohol (1S,2R) is added in four portions over one-half hour to 40 ml. of thionyl chloride in an ice bath. The reaction mixture is allowed to warm to 25° over 3 hours and then stirred at 40°–45° for 15 minutes. After concentrating at 15 mm. and 30°–35°, benzene is added and the mixture reconcentrated. Fifty ml. of 2 N hydrochloric acid solution is added to the residue and the mixture is heated at reflux for 2 hours. The solution is concentrated under vacuum, 50 ml. of isopropyl alcohol is added to the residue and then reconcentrated. The residue is dissolved in 30 ml. of water, the pH adjusted to 8.0 with potassium carbonate and the product extracted with 4 × 30 ml. of ethyl acetate. The ethyl acetate extracts are combined, dried over anhydrous magnesium sulfate, filtered and concentrated. The residue, 0.95 g., is dissolved in ethanol and treated with 0.90 g. fumaric acid. The fumarate salt of the product, 0.63 g., m.p. 196.7°–202.2° dec. is recrystallized from a methanol-ethyl acetate mixture to give 0.27 g. of (−) (1R,2R) threo m-hydroxy-α-[1-aminoethyl]-benzyl alcohol fumarate, m.p. 208.2°–209.7° dec. $[\alpha]_D^{H_2O} = -28° (C=2)$.

Anal. — Calc. for $C_{11}H_{15}NO_4$:
C, 58.65; H, 6.71; N, 6.22;
Found:
C, 58.84; H, 6.53; N, 6.35.

EXAMPLE 14

(+) (1S,2S) Threo m-Hydroxy-α-[1-aminoethyl]-benzyl Alcohol Fumarate (+) (1S,2S) Threo m-hydroxy-α-[1-aminoethyl]-benzyl alcohol fumarate is prepared from (−) erythro m-hydroxy-α-[1-aacetamidoethyl]-benzyl alcohol (1R,2S) by the same procedure used for the preparation of the (−) threo isomer (Example 13). The crude product is recrystallized from a methanol-ethyl acetate mixture to give an analytical sample, m.p. 206.0°–207.0° dec. $[\alpha]_D^{H_2O} = +26° (C=2)$.

Anal. — Calc. for $C_{11}H_{15}NO_4$:
C, 58.65; H, 6.71; N, 6.22;
Found:
C, 58.78; H, 6.78; N, 6.11.

EXAMPLE 15

The following example will describe typical pharmaceutical formulations utilizing the active compounds of the present invention.

Dry Filled Capsule
Ingredients        Amounts, Mg.

| | |
|---|---|
| (−) Erythro 3-(m or p-chlorobenzyloxy)-α-[1-aminoethyl]-benzyl alcohol in the form of a pharmaceutically acceptable salt (such as the hydrogen maleate) equivalent to | 5.0 mg. of base |
| Sodium Bisulfite | 0.44 mg. |
| Corn Starch | 190.07 mg. |

Compressed Tablet
Ingredients        Amounts, Mg.

| | |
|---|---|
| (−) Erythro 3-(m or p-chlorobenzyloxy)-α-[1-aminoethyl]-benzyl alcohol in the form of a pharmaceutically acceptable salt equivalent to | 5.0 mg. of base |
| Sodium Bisulfite | 0.10 mg. |
| Mannitol | 20.00 mg. |
| Calcium Sulfate | 161.26 mg. |
| Corn Starch | 5.0 mg. |
| Talc | 3.00 mg. |
| Guar Gum | 10.00 mg. |
| FD & C Yellow No. 6 Al Lake 17% | 0.15 mg. |
| Magnesium Stearate | 1.00 mg. |

Injectable Solution
Ingredients        Amounts, Mg.

| | |
|---|---|
| (−) Erythro 3-(m or p-chlorobenzyloxy)-α-[1-aminoethyl]-benzyl alcohol in the form of a pharmaceutically acceptable salt equivalent to | 5.0 mg. of base |
| Sodium Bisulfite | 2.20 mg. |
| Sodium Chloride | 4.40 mg. |

Ingredients        Amounts, Mg.

| | |
|---|---|
| Methylparaben USP | 1.50 mg. |
| Propylparaben USP | 0.20 mg. |
| Water for injection q.s. | 1.0 ml. |

The parabens may be replaced with other preservatives such as 0.5 percent phenol or 0.01–0.02 percent benzalkonium chloride. Similarly, other active ingredients such as those compounds shown in Example 5 can be substituted for the active ingredients used in the above formulations.

What is claimed is:

1. A method of treating hypertension or inhibiting gastric secretion in a patient having elevated blood pressure or excessive gastric secretion which comprises administering to the said patient, in combination with a pharmaceutical carrier, a therapeutically effective amount of a compound selected from the group consisting of (1) a compound of the formula

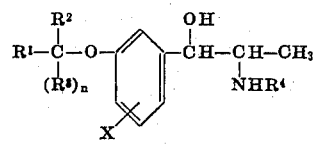

wherein $R^1$ is hydrogen, lower alkyl, lower alkyl substituted with hydroxy, amino or carboxyl groups, cycloalkyl containing up to seven carbon atoms, cycloalkenyl containing up to seven carbon atoms, lower alkenyl, lower alkoxy, phenyl, substituted phenyl, benzyl, substituted benzyl or a heterocyclic radical selected from the group consisting of pyridine, piperidine, furan, pyran, thiophene, pyrazine, pyridine-N-oxide, pyrimidine, thiazole, imidazole, benzimidazole and the lower alkyl, halogen and methoxy substituted derivatives of such heterocyclic rings; $R^2$ is hydrogen, lower alkyl, phenyl or substituted phenyl wherein the substituents in said substituted phenyl and substituted benzyl are hydroxy, lower alkyl, lower alkoxy, halogen, halo lower alkyl, amino, mercapto, nitro, sulfamoyl or phenyl and wherein $R^1$ and $R^2$ can be combined to form a cycloalkyl or cycloalkenyl ring containing up to seven carbon atoms or a heterocyclic ring selected from the group consisting of piperidyl, piperazinyl, pyridyl or pyridyl-N-oxide; $R^3$ is hydrogen, phenyl or lower alkyl; R⁴ is hydrogen or lower alkyl; X is hydrogen, halogen, lower alkyl or phenyl, and *n* is the integer 1 or is 0 when R¹ and R² define a 1-cycloalkenyl or a pyridyl or a pyridyl-N-oxide ring and (2) a non-toxic acid addition salt of a compound of group 1.

2. A method of treating hypertension or inhibiting gastric secretion in a patient having elevated blood pressure or excessive gastric secretion which comprises administering to the said patient, in combination with a pharmaceutical carrier, a therapeutically effective amount of a compound selected from the group consisting of (1) a compound of the formula

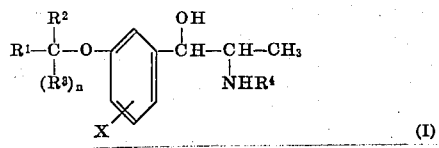

wherein R¹ is hydrogen, lower alkyl, lower alkyl substituted with hydroxy, amino or carboxyl groups, cycloalkyl containing up to seven carbon atoms, cycloalkenyl containing up to seven carbon atoms, lower alkenyl, lower alkoxy, phenyl, substituted phenyl, benzyl, substituted benzyl or a heterocyclic radical selected from the group consisting of pyridine, piperidine, furan, pyran, thiophene, pyrazine, pyridine-N-oxide, pyrimidine, thiazole, imidazole, benzimidazole and the lower alkyl, halogen and methoxy substituted derivatives of such heterocyclic rings; R² is hydrogen, lower alkyl, phenyl or substituted phenyl wherein the substituents in said substituted phenyl and substituted benzyl are hydroxy, lower alkyl, lower alkoxy, halogen, halo lower alkyl, amino, mercapto, nitro, sulfamoyl or phenyl and wherein R¹ and R² can be combined to form a cycloalkyl or cycloalkenyl ring containing up to 7 carbon atoms or a heterocyclic ring selected from the group consisting of piperidyl, piperazinyl, pyridyl or pyridyl-N-oxide; R³ is hydrogen, phenyl or lower alkyl; R⁴ is hydrogen or lower alkyl; X is hydrogen, halogen, lower alkyl or phenyl, and *n* is the integer 1 or is 0 when R¹ and R² define a 1-cycloalkenyl or a pyridyl or a pyridyl-N-oxide ring and (2) a non-toxic acid addition salt of a compound of group 1, with the proviso that the

group is not benzyl or methyl.

3. The method of claim 1 wherein the compound (1) or (2) is administered in amounts of from 5 to 500 mg. daily.

4. The method of claim 2 wherein the compound (1) or (2) is administered in amounts of from 5 to 500 mg. daily.

5. A method of treating hypertension or inhibiting gastric secretion in a patient having elevated blood pressure or excessive gastric secretion which comprises administering to the said patient, in combination with a pharmaceutical carrier, a therapeutically effective amount of a compound selected from the group consisting of (1) a compound of the formula

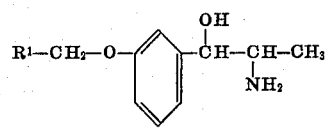

wherein R¹ is m-chlorophenyl or p-chlorophenyl and (2) a non-toxic acid addition salt thereof.

6. A method of treating hypertension or inhibiting gastric secretion in a patient having elevated blood pressure or excessive gastric secretion which comprises administering to the said patient, in combination with a pharmaceutical carrier, from 5 to 500 mg. per day of a compound selected from the group consisting of (1) a compound of the formula

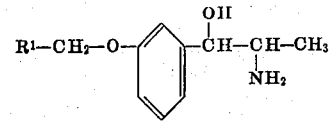

wherein R¹ is m-chlorophenyl or p-chlorophenyl and (2) a non-toxic acid addition salt thereof.

7. A method of treating hypertension or inhibiting gastric secretion in a patient having elevated blood pressure or excessive gastric secretion which comprises administering to the said patient, in combination with a pharmaceutical carrier, a therapeutically effective amount of a compound selected from the group consisting of (1) a compound of the formula

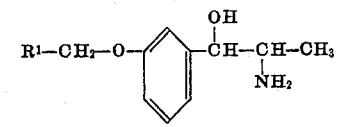

wherein R¹ is p-fluorophenyl or m-fluorophenyl and (2) a non-toxic acid addition salt thereof.

8. A method of treating hypertension or inhibiting gastric secretion in a patient having elevated blood pressure or excessive gastric secretion which comprises administering to the said patient, in combination with a pharmaceutical carrier, from 5 to 500 mg. per day of a compound selected from the group consisting of (1) a compound of the formula

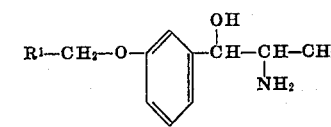

wherein R¹ is p-fluorophenyl or m-fluorophenyl and (2) a non-toxic acid addition salt thereof.

* * * * *